United States Patent Office 2,903,885
Patented Sept. 15, 1959

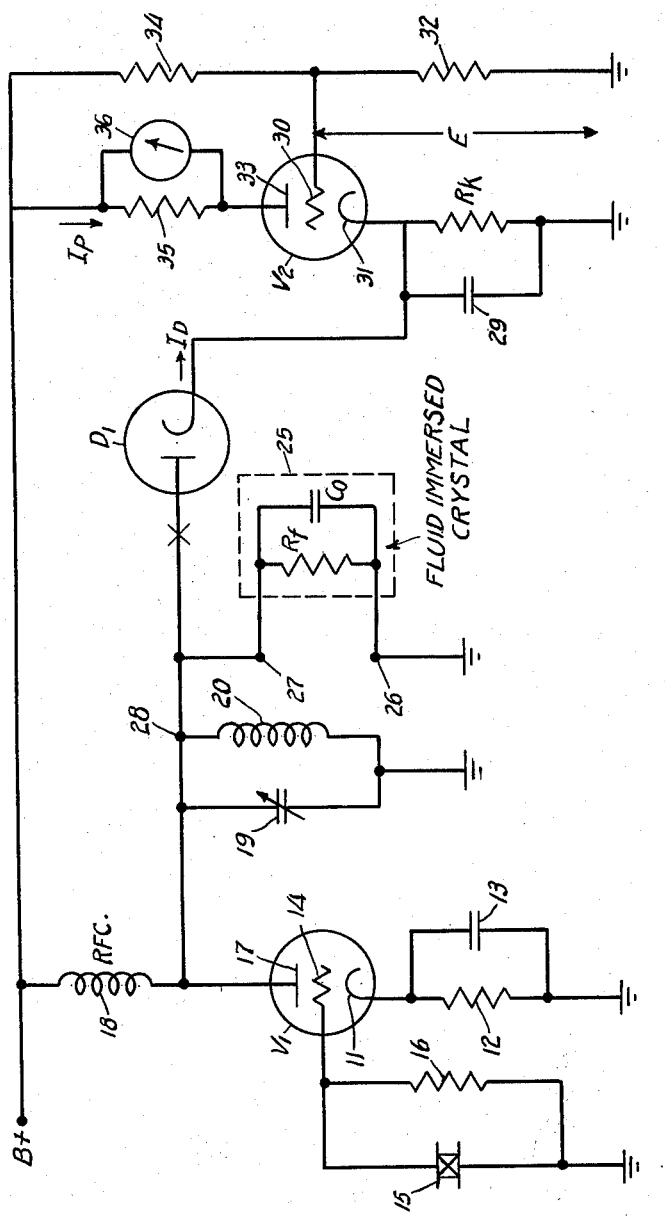

2,903,885
ULTRASONIC DENSITOMETER

Jack Kritz, Westbury, N.Y.

Application September 20, 1956, Serial No. 611,032

5 Claims. (Cl. 73—32)

The present invention relates to apparatus for measuring the density or the acoustic impedance of a fluid by means of an ultrasonic wave.

The invention utilizes the principle that a resonant piezoelectric transducer will present an electrical impedance whose resistive component is a measure of the acoustic impedance of the fluid, namely the product of the density of the fluid and the acoustic propagation velocity in the fluid. It is an object of the invention to provide a simple circuit for obtaining electrical quantities determined by the resistive component of a fluid-immersed transducer, which electrical quantities are proportional to the acoustic impedance $\rho v$.

It is another object of my invention to provide a continuous measurement of the density of a fluid in a simple manner with a minimum of apparatus.

The objects of the invention are attained by connecting a piezoelectric crystal adapted to be immersed in a fluid to the output circuit of a constant frequency oscillator which energizes the crystal at its resonant frequency. The amplitude of the oscillations in the output circuit of the oscillator is maintained at a constant value by a suitable means such as a clamping circuit, and the oscillator is designed so that under these conditions it supplies constant output power. An automatically varying load is connected effectively in parallel with the fluid immersed crystal. The power absorbed by the crystal will vary with the acoustic impedance of the fluid. Since the oscillator supplies constant output power, the current supplied by the oscillator to the load will vary inversely with the current through the crystal. A measuring circuit is then connected to the load and includes a meter which may be calibrated either in acoustic impedance or in density.

The invention will be fully understood and other objects and advantages thereof will become apparent from the following description and the drawing, in which:

The figure shows a circuit diagram of one embodiment of the invention.

Referring to the drawing, there is provided a crystal control oscillator including the tube $V_1$. The cathode 11 of the tube is connected to ground through a self-biasing circuit 12, 13. The control grid 14 is connected to ground through the crystal 15 and a grid leak 16. An anode 17 of the tube is supplied with voltage from a high voltage source B+ through radio frequency choke coil 18. The output circuit of the oscillator includes a parallel resonant circuit 19, 20 tuned substantially to the same frequency as piezoelectric crystal 15. A piezoelectric crystal 25 which is adapted to be immersed in the fluid to be measured, is connected to terminals 26 and 27 in parallel with tank circuit 19, 20. For the purposes of analysis, the crystal is represented by its equivalent circuit $R_f$ and $C_o$ in parallel with each other. Crystal 25 is energized at its resonant frequency by the oscillator.

The high voltage terminal 28 of the output circuit is clamped at a predetermined voltage level by being connected through a clamping diode $D_1$ and a resistor $R_k$ to ground. Resistor $R_k$ in parallel with a bypass condenser 29 forms the cathode load of a cathode follower tube $V_2$ having a cathode 31. The control grid 30 of this tube is biased to a voltage E by means of resistors 32 and 34. The anode 33 of tube $V_2$ is supplied with current from the B+ voltage source through a small resistor 35, across which is connected a meter 36 adapted to be calibrated directly in acoustic impedance or density.

The operation of the circuit will now be described. Tube $V_1$ oscillates as a conventional tuned-grid tuned-plate oscillator, except that the output voltage at its plate and therefore across terminals 26, 27 of crystal 25 is regulated to a value determined by the voltage across resistor $R_k$, by virtue of the connection through clamping diode $D_1$. The output voltage of the oscillator, therefore, is an ultrasonic frequency signal having a peak amplitude closely equal to the voltage E, that is, the D.C. bias voltage established at the grid 30 of the cathode follower $V_2$. It is understood, of course, that the voltage across resistor $R_k$ is closely equal to the voltage E on grid 30. Since tube $V_1$ will operate as a class C oscillator whose plate voltage swing is held constant, and since the feedback parameters of tube $V_1$ are constant, both the plate power input and the tube losses are constant. It follows therefore that the output power of the oscillator remains constant. The output power is the sum of the power taken by the resistance $R_f$, which is the equivalent resistance of the acoustic impedance of the fluid, and the load $R_k$. If the resistance $R_f$ varies, the power delivered into the cathode follower resistor $R_k$ through clamping diode $D_1$ will vary, keeping the total power extracted from the oscillator constant.

Consider a starting condition where the connecting lead to the diode $D_1$ is broken at the point marked X. The current in the cathode of tube $V_2$ is given closely by $$\frac{E}{R_k}=I_k$$

This current is also equal to the plate current, thus for this condition $I_k=I_p$. With the broken lead reconnected and $R_f=\infty$ (effectively removed from the circuit) the parameters of the oscillator are so adjusted that the average current $I_d$ delivered to cathode 31 just equals $I_k$. This adjustment can be obtained by adjusting E, or $R_k$ as well. Tube $V_2$ is now driven to cutoff, or since $I_p=I_k-I_d$, $I_p=0$ for this condition. If now a value for $R_f$ is introduced where $R_f=K\rho v$ (K is a transducer constant), the following relations hold.

The original power delivered from the oscillator (absence of $R_f$) is given by P=E $I_o$=E $I_k$=constant. With the introduction of $R_f=K\rho v$, the power into the transducer $P_y$ is given by $$P_y=\frac{E^2}{2R_f}=\frac{E^2}{2K\rho v}$$

This power must be deducted from the power into clamp diode $D_1$ to keep the total power delivered constant. The power delivered to clamp diode $D_1$ is now given as:

$$P_c=P-\frac{E^2}{2K\rho v}=EI_k-\frac{E^2}{2K\rho v}$$

$P_c$ however is given by $P_c$=E $I_d$ so that we now have $$EI_d=EI_k-\frac{E^2}{2K\rho v} \text{ or } I_d=I_k-\frac{E}{2K\rho v}$$

but $$I_p=I_k-I_d \text{ and } I_p=\frac{E}{2K\rho v}$$

It is to be noted that E is a constant and 2K is constant.

The plate current $I_p$ is thus inversely proportional to $\rho v$ and serves as a measure of the fluid acoustic impedance. It is important to note that the result is independent of the capacity $C_0$ of the transducer, since this merely serves as additional tuning capacity across the oscillator. The result is also independent of the losses or the Q of tuning coil 20.

A simple way in which the plate current can be used to give a voltage proportional to $\rho v$ is to connect a small resistor 35 in series with the plate 33 of $V_2$. The potential of plate 33 will change nearly linearly with $\rho v$ for small excursions of $\rho v$. The meter 36 may therefore be calibrated in units of $\rho v$. If a fluid having a known velocity of acoustic propagation is measured meter 36 may be calibrated to read the density of the fluid.

I have described what I believe to be the best embodiments of my invention. I do not wish, however, to be confined to the embodiments shown, but what I desire to cover by Letters Patent is set forth in the appended claims.

I claim:

1. Apparatus for measuring the density of a fluid comprising a constant frequency oscillator having an output circuit, a piezoelectric crystal adapted to be immersed in the fluid, said crystal being connected in parallel with the output circuit of the oscillator, means connected to said oscillator for maintaining the alternating voltage across said crystal and the output power of the oscillator substantially constant irrespective of the portion of said output power which is dissipated by the crystal, and measuring means connected to said output circuit for measuring an electrical quantity which is a function of the residual portion of said oscillator power which is not dissipated by said crystal when immersed in the fluid for indicating the density of the fluid.

2. Apparatus according to claim 1, wherein the means for maintaining the output power of the oscillator substantially constant and the measuring means include a load connected in parallel with said crystal, means for supplying a current to said load varying inversely with respect to the loading of the carystal by the fluid and means connected to said load for measuring the current supplied to said load by the oscillator.

3. Apparatus according to claim 1, wherein said measuring means and said means for maintaining the output power of the oscillator substantially constant include an electron tube cathode follower circuit, a resistor connected to constitute the cathode load of the cathode follower, a second resistor connected in series with the cathode and anode of said electron tube, means for biasing the electron tube substantially to anode current cut-off when the crystal is heavily mechanically loaded, and said measuring means further including voltage measuring means connected across said second resistor.

4. Apparatus for measuring the density of a fluid, comprising a constant frequency oscillator including an electron tube, a piezoelectric crystal connected between the control grid of said tube and ground, a self-biasing circuit connected between the cathode of said tube and ground, a parallel-resonant circuit connected between the anode of said tube and ground, a second piezoelectric crystal connected in parallel with said resonant circuit and adapted to be immersed in the fluid; an electron tube cathode follower having a load resistor connected between its cathode and ground, a clamping diode having its cathode connected to the cathode of said cathode follower and its anode connected to the high voltage terminal of the second crystal, means connected to the control grid of the cathode follower for biasing it to cut-off when the second crystal is heavily mechanically loaded and means responsive to the anode current of the cathode follower for indicating the density of the fluid.

5. Apparatus for measuring the acoustic impedance of a fluid comprising a piezoelectric crystal adapted to be immersed in the fluid, said crystal having a high voltage and a low voltage terminal, means connected between said terminals for supplying radio frequency energy at a substantially constant frequency, a diode having its anode connected to the high voltage terminal of the crystal, an electron tube cathode follower having a load resistor connected between its cathode and the low voltage terminal of the crystal, the cathode of said diode being connected directly to the cathode of the cathode follower, and means for biasing the cathode follower to cut-off when the crystal is heavily mechanically loaded, and means responsive to the anode current of the cathode follower for indicating the acoustic impedance of the fluid.

References Cited in the file of this patent

UNITED STATES PATENTS

| | | |
|---|---|---|
| 2,340,992 | Siegel | Feb. 8, 1944 |
| 2,701,469 | Burns | Feb. 8, 1955 |
| 2,711,646 | Mendousse | June 28, 1955 |